United States Patent
Giammaria et al.

(10) Patent No.: US 9,471,294 B2
(45) Date of Patent: Oct. 18, 2016

(54) EXTENSIONS FOR DEPLOYMENT PATTERNS

(71) Applicant: International Business Machines Corporation, Armonk, NY (US)

(72) Inventors: Alberto Giammaria, Austin, TX (US); Christopher A. Peters, Round Rock, TX (US); Thomas Spatzier, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/464,756

(22) Filed: Aug. 21, 2014

(65) Prior Publication Data

US 2015/0277884 A1    Oct. 1, 2015

Related U.S. Application Data

(63) Continuation of application No. 14/230,176, filed on Mar. 31, 2014.

(51) Int. Cl.
*G06F 9/45* (2006.01)
*G06F 9/445* (2006.01)
*G06F 17/30* (2006.01)
*G06F 9/44* (2006.01)

(52) U.S. Cl.
CPC . *G06F 8/60* (2013.01); *G06F 8/70* (2013.01); *G06F 17/30867* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,681,391 B1 * | 1/2004 | Marino | G06F 8/61 717/175 |
| 6,918,112 B2 * | 7/2005 | Bourke-Dunphy | G06F 8/61 717/177 |
| 7,415,707 B2 * | 8/2008 | Taguchi | G06F 8/61 717/175 |
| 7,526,764 B2 * | 4/2009 | Fanshier | G06F 8/61 717/174 |
| 7,707,550 B2 * | 4/2010 | Resnick | G05B 15/02 700/169 |
| 7,721,284 B2 * | 5/2010 | Bykov | G06F 8/60 717/177 |
| 7,890,949 B2 * | 2/2011 | Inada | G06F 9/4411 717/175 |
| 7,979,515 B2 * | 7/2011 | Morikawa | G06F 8/61 717/177 |
| 8,156,489 B2 * | 4/2012 | Kane | G06F 8/61 717/175 |
| 8,225,309 B2 * | 7/2012 | Zhang | G06F 8/61 717/175 |
| 8,281,307 B2 * | 10/2012 | Arnold | G06F 8/36 709/227 |

(Continued)

OTHER PUBLICATIONS

Bulej, et al., "Adaptive Deployment in Ad-Hoc Systems Using Emergent Component Ensembles: Vision Paper"; 2013; ACM; [retrieved on Jun. 14, 2016]; Retrieved from Internet <URL:http://dl.acm.org/citation.cfm?id=2479922>; pp. 343-346.*

(Continued)

*Primary Examiner* — Xi D Chen
(74) *Attorney, Agent, or Firm* — Robert J. Shatto; Michael A. Petrocelli

(57) ABSTRACT

Extension patterns are deployed to core deployment patterns stored in a first software repository. An event relating to registration of a component is detected. In response to detecting the event, a tool registry can be queried to identify one or more extension deployment patterns for use with one or more core deployment patterns. Based upon the query, one or more extension deployment components can be retrieved from a second software repository. The one or more extension deployment components can be deployed on top of one or more instances of the one or more core deployment patterns.

10 Claims, 8 Drawing Sheets

(56) References Cited

U.S. PATENT DOCUMENTS

| | | | | |
|---|---|---|---|---|
| 8,813,060 | B2* | 8/2014 | Tewari | G06F 8/60 717/174 |
| 8,832,679 | B2* | 9/2014 | Suchy | G06F 8/61 717/174 |
| 9,038,023 | B2* | 5/2015 | Zenz | G06F 9/44505 717/120 |
| 2005/0289536 | A1* | 12/2005 | Nayak | G06F 8/61 717/174 |
| 2010/0058331 | A1* | 3/2010 | Berg | G06F 8/60 717/177 |
| 2012/0198439 | A1* | 8/2012 | Kane | G06F 8/61 717/177 |
| 2012/0297059 | A1 | 11/2012 | Bross | |
| 2012/0324434 | A1* | 12/2012 | Tewari | G06F 8/60 717/174 |
| 2013/0239089 | A1 | 9/2013 | Eksten et al. | |
| 2014/0089913 | A1* | 3/2014 | Aaronson | G06F 8/61 717/174 |

OTHER PUBLICATIONS

Gorton, et al., "An Extensible Lightweight Architecture for Adaptive J2EE Applications"; 2006 ACM; [retrieved on Jun. 14, 2016]; Retrieved from Internet <URL:http://dl.acm.org/citation.cfm?id=1210537>; pp. 47-54.*

Hachicha, et al., "Towards Resource-aware Business Process Development in the Cloud"; 2015 IEEE; [retrieved on Jun. 14, 2016]; Retrieved from Internet <URL:http://ieeexplore.ieee.org/stamp/stamp.jsp?tp=&arnumber=7098050>; pp. 761-768.*

Kichkaylo, Karamcheti, "Optimal Resource-Aware Deployment Planning for Component-based Distributed Applications"; 2004 IEEE; [retrieved on Jun. 14, 2016]; Retrieved from Internet <URL:http://ieeexplore.ieee.org/stamp/stamp.jsp?tp=&arnumber=1323517>; pp. 150-159.*

Mell et al., "The NIST Definition of Cloud Computing", National Institute of Standards and Technology, NIST Special Publication 800-145, Sep. 2011, Gaithersburg, MD.

Giammaria et al., "Extensions for Deployment Patterns," U.S. Appl. No. 14/230,176, filed Mar. 31, 2014.

* cited by examiner

EXTENSIONS FOR DEPLOYMENT PATTERNS

BACKGROUND

The present disclosure relates to providing management functions for applications deployed in virtual environments, and more specifically, to the use of extensions with instances of a deployment pattern.

Various systems provide a way to simplify deployment of software applications in a cloud environment. For instance, virtual images and patterns can be used to deploy an application one or more times. A pattern in this context can include a logical description of both the physical and virtual assets of a particular solution. Patterns can provide flexibility and customization options and can define components such as an operating system, virtual machines, applications and additional software solutions. Some patterns can be optimized and constructed for the purpose of supporting a singular workload. Such patterns can often be successfully deployed with little customization, which can provide a direct method for implementing a rapid deployment cycle. Other patterns can be constructed for supporting multiple workloads.

SUMMARY

Consistent with various embodiments, a method is applied for deploying extension patterns to core deployment patterns stored in a first software repository. The method includes detecting an event relating to registration of a component; querying, in response to detecting the event, a tool registry to identify one or more extension deployment patterns for use with one or more core deployment patterns; retrieving, based upon the query, one or more extension deployment components from a second software repository; and deploying the one or more extension deployment components on top of one or more instances of the one or more core deployment patterns.

Certain embodiments are directed toward a system for deploying extensions to core deployment patterns stored in a first software repository. The system includes: at least one computer processor circuit and at least one computer readable medium storing executable instructions that when executed: detect an event relating to registration of a component in a deployment pattern; query, in response to the event, a tool registry to identify one or more extension deployment patterns for use with one or more core deployment patterns; retrieve, based upon the query, one or more extension deployment components from a second software repository; and deploy the one or more extension deployment components on top of one or more instances of the one or more core deployment patterns.

Embodiments are directed toward a computer program product for deploying extensions to core deployment patterns stored in a first software repository. The computer program product includes a computer readable storage medium having program instructions embodied therewith, the program instructions readable by a processor circuit to cause the processor circuit to: detect an event relating to registration of a component in a deployment pattern; query, in response to the event, a tool registry to identify one or more extension deployment patterns for use with one or more core deployment patterns; retrieve, based upon the query, one or more extension deployment components from a second software repository; and deploy the one or more extension deployment components on top of the one or more core deployment patterns.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
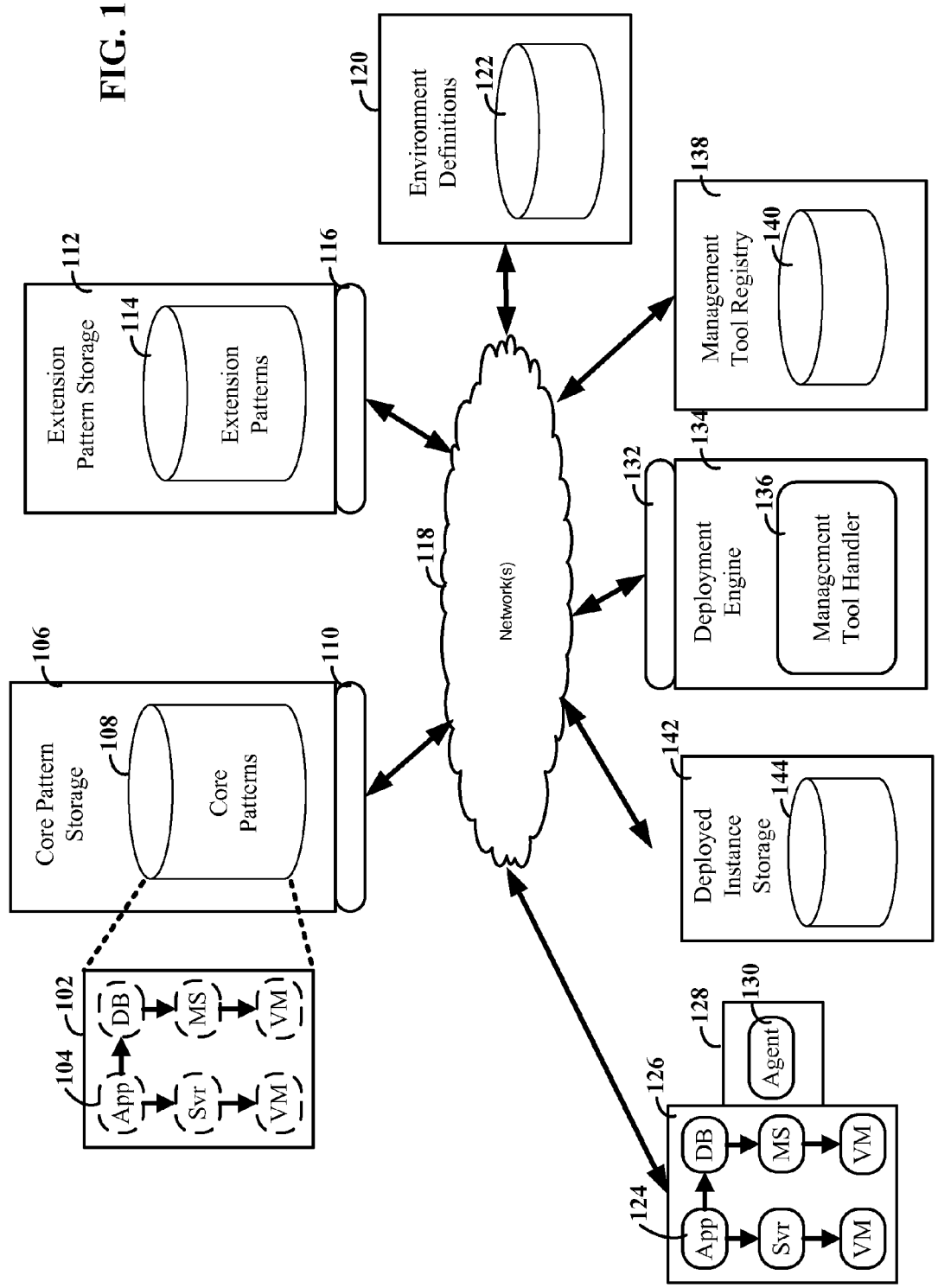
FIG. 1 depicts a system diagram for deploying extension patterns onto core patterns, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DEATAILED DESCRIPTION

Aspects of the present disclosure relate to management functions for applications deployed in virtual environments, more particular aspects relate to the use of extensions with deployment patterns. While the present disclosure is not necessarily limited to such applications, various aspects of the disclosure may be appreciated through a discussion of various examples using this context.

Aspects of the present disclosure are directed toward linking management tools or functions to an existing deployment (core) pattern, which may or may not have already been deployed. Various embodiments relate to deploying or updating management functions for such applications in a manner that allows for management agents to be installed on the respective instances of the core pattern. In some embodiments, data is made available to remote monitoring tools in connection with the management functions. Particular embodiments relate to facilitating the use of management tools with deployment patterns in a manner that allows management tools to be applied differently to the same deployment pattern (e.g., based upon environmental factors or other considerations). Links can then be generated between deployed instances and corresponding core patterns, extension patterns and associated management tools. Linking the patterns to deployed instances can be useful for facilitating the deployment of management tools to instances of a core deployment pattern while the core deployment pattern remains (substantially or completely) unchanged. This can be done while also having different management tool options and settings for different deployed instances of the same core pattern (e.g., with or without management tools or agents). For example, in one environment may desire to use aggressive monitoring that yields more data but has performance impact and in another environment use less aggressive monitor that yields less data but has less performance impact (e.g., monitor only for severe events).

As discussed herein, core deployment patterns can be used in connection with complex tasks by creating a repeatable deployable form, which can help with time-to-value and operational expenses. These patterns can be developed from collective knowledge from previous projects and can be selected and executed at an administrator's command. Users can then use these patterns without requiring in depth knowledge of the technological complexity behind the pattern generation. Such core deployment patterns can be deployed as standalone instances that can carry out desired functions and support one or more workloads.

Patterns can also be modified based on a particular application and usage. Accordingly, some embodiments are directed toward identifying multiple patterns that may be relevant to a management tool. For instance, an administrator may create multiple core deployment patterns (e.g., by modifying existing core deployment patterns or creating entirely new core deployment patterns). The extension pattern for a management tool may be applicable to one or more components (or nodes) from the patterns, but these components may be materially different (or not present) in the various deployment patterns. In addition to the installable files for the components, information about core deployment patterns, including modifications to core deployment patterns, can be stored as metadata. Information about extension deployment partners (e.g., for management tools) can also be stored as metadata. Metadata can describe features such as the type of node(s) and environmental parameters (such as whether or where instances of the various components or tools should be deployed). Aspects of the present disclosure are directed toward a system that can identify, for a particular management tool, candidate deployment patterns from a plurality of potential deployment patterns based upon such stored metadata.

Certain embodiments can be used for end-to-end application lifecycle management and the integration of multiple different management tools for this purpose. For instance, each tool can be configured to handle certain domains of application lifecycle management. Certain tools can be used for the development of an application; other tools can be used for managing application installable files (e.g., binaries) as assets; yet other tools can be used for monitoring the performance of a deployed application. These, and other, types of applications can therefore use patterns to describe deployment parameters, such as what infrastructure and middleware is required and how application components get deployed on this infrastructure and middleware. Embodiments of the present disclosure are directed toward facilitating integration of tools for runtime management of a deployed application (e.g., for performance monitoring). For a variety of reasons discussed herein, embodiments are directed toward a system in which the core deployment patterns can be maintained separately from the extension deployment patterns of the management tools. The extension deployment patterns can include definitions for deploying, for example, monitoring agents that are used to provide data to external management modules or servers.

Embodiments are directed toward a system configured to detect and respond to when new runtime management tools become available, including management tools that are designed for managing instances of applications that have already been deployed. Rather than updating all existing deployment instances as well as their patterns (so that agents get deployed automatically for newly deployed applications), a management tool handler module can deploy extension patterns on top of the existing deployments (also referred to herein as "instances" of a deployment pattern), as well as for future deployments. For instance, deploying the extension pattern on top of the existing core deployment can include installing a monitoring tool on a virtual machine and configuring the monitoring tool to monitor a particular component of the core deployment. The system can be designed to allow users to create new "tooling connections" for deployed applications and propagating those new connections to runtime management components for already deployed applications in an automated manner.

Turning now to the figures, FIG. 1 depicts a system diagram for deploying extension patterns onto core patterns, consistent with embodiments of the present disclosure. Core patterns 102 include topology definitions for how components (or nodes) 104 are deployed within different environments. For example, the components 104 could include, but are not necessarily limited to, virtual machines (VM), web (or similar) server (Svr), software applications and services (App), databases (DB), and database management systems (MS). Other component types and configurations are also possible.

Consistent with embodiments, the core patterns can be stored in one or more core pattern databases 108. A core pattern storage server 106 (or software repository server) can control access requests for patterns stored in the core pattern database 108. An interface 110 can be designed to facilitate such access requests by providing a standard interface for use by different systems and modules that seek access the core patterns over network 118. Network 118 can include, but is not necessarily limited to, local area network(s) (LANs), wide area networks (WANs), the global Internet, proprietary networks, private networks and combinations thereof.

According to embodiments, one or more deployment engines or servers 134 can be configured to deploy core patterns to create one or more instances 126 of the core patterns. This can include the creation and configuration of various components 124. Deployment engine 134 can include an interface 132 that is designed to communicate with the interface 110 of the core pattern storage server 106. After the deployment engine 134 retrieves core patterns from the core pattern storage server 106, data stored in the patterns can be used to determine how to configure and initiate the instance 124.

Consistent with certain embodiments, the deployment engine 134 can include a management tool handler module 136. The management tool handler can be configured to detect an event relating to registration of a component. For instance, the event can be the deployment of a new instance of a core pattern, or it can be the registration of a new management tool or facet in the management tool registry database 140. In response to detecting the event, the management tool handler can query the management tool registry server 138 for information related to the event. For instance, the query could request information on all management tools related to the components of a core pattern for an instance that is to be deployed. In another instance, the query could request information regarding which components are relevant to a newly registered management tool. In some cases, the management tool handler can also query the core pattern storage server 106 to identify relevant core patterns based upon correlations between components of the core patterns and one or more management tools.

Based upon the query, the management tool handler can identify one or more extension deployment patterns for use with one or more core deployment patterns. The management tool handler can then retrieve the identified extension deployment component(s) from a second software repository, such as extension pattern storage server 112 and extension pattern database 114. The management tool handler can then deploy the one or more extension deployment components on top of instances of one or more core deployment patterns (whether the instances are newly deployed or previously existing).

Consistent with various embodiments, the management tool handler can access and retrieve environment information from environment definitions server 120 and associated database 122. The retrieved information can then be used to determine which extension patterns to deploy on top of which instances of core patterns. For instance, the environmental data could specify whether a particular instance was deployed in a test environment or in a production environment. A particular extension pattern could be designed for use with one of these environments and not the other. It is also possible that the extension pattern could be designed for neither or both of these environments. Accordingly, the management tool handler can use the environmental data as a filter that determines which, if any, instances should receive the extension pattern.

According to embodiments, the management tool handler can be configured to determine when, where and how to deploy management tools based upon metadata describing the various deployment patterns. For instance, useful metadata can be stored system management solution components. A determination regarding deployment decisions can be implemented dynamically in a manner that allows extensions to a variety of different core deployment patterns to be extended without changing the underlying core deployment pattern. This can be true for either existing or future instances of the core deployment pattern. Various embodiments allow for the determination to be made based upon an analysis of a subset of the core deployment pattern (e.g., based upon one or more of the components in the core pattern). An appropriate management tool can be selected for the subset along with information on how to integrate the management tool with the subset. The subset, now with the management tool extension, can then be merged back into the core deployment pattern without modifying the original core deployment pattern. Moreover, multiple management tools and extensions can be selected for a single core deployment pattern. The management tool handler can also identify additional actions to carry out deployment of the extension pattern for the management tool. For instance, the management tool handler can identify installation procedures for the management tool and register the management tool with a remote management infrastructure or server.

In some embodiments, the interface 116 for the extension pattern storage server 112 and the interface 110 for the core pattern storage server 106 can be configured to use a common standard. Moreover, the same general data structure can be used to describe both the extension patterns and the core patterns. This can be particularly useful for allowing the deployment engine 134 to use both the extension and core patterns using the same interfaces, modules and data processing procedures. Consistent with various embodiments, an application programming interface (API) of each management tool can be configured to provide information regarding what types of components it can manage (e.g., it can monitor) and whether agents have to be deployed on the managed systems. This can include registering a management tool (or agent) in management tool registry 138 when the tool is first introduced and also possibly changing the registry entry when the tool is modified. When a tool/agent gets installed and configured a pointer from the registry entry can be created to help locate the installed agent. For example, the Internet Protocol (IP) address, Uniform Resource Locator (URL), or other identifier can be used as a point to identify and locate an installed instance of an agent.

Various embodiments allow for the use of a deployed instance storage server 142, which can store information about deployed instances in a database 144. For instance, deployed instances using the same core pattern may be deployed using different configurations depending upon the particular of each deployment. Data regarding the different configuration for each of the different deployed instances can be stored in the database 144. As an example, a particular instance of deployed component may be hosted on a first virtual machine, whereas another instance may be deployed on a second, different virtual machine, or even without a virtual machine (e.g., using a dedicated server). Identifying information about the virtual machine(s) can be stored along with other information, such as the IP address(es) and the configuration of port(s) associated with the IP address(es). This information can then be used by the management tool handler during deployment of extension patterns.

According to certain embodiments, various elements can each be configured to conform to a standard protocol such as Topology and Orchestration Specification for Cloud Applications (TOSCA) (Version 1.0 or otherwise). The TOSCA standard can be used to facilitate the portability of cloud applications and services. For instance, TOSCA can describe, in terms of the interoperable, application and infrastructure cloud services, the relationships between parts of the service, and the behavior of these services (e.g., deploy, patch or shutdown). These relationships can be described without requiring knowledge of details of the creator of the service, the cloud provider, or the hosting technology. TOSCA can also make it possible for higher-level operational behavior to be associated with cloud infrastructure management. For instance, types of management components can be expressed as TOSCA Node Types. Connections of managed components to the management tool can be expressed as TOSCA Relationship Types (that may also include operations to register a component).

According to certain embodiments, the management tool handler can be configured to identify candidate instances of patterns that are already deployed using links between core patterns and deployed instances of the core patterns. For instance, the deployment engine 134 can maintain a set of links between the patterns and their instances. When a deployment engine gets instructed by the user to instantiate a pattern it can also receive a pointer to the pattern from the user. The deployment engine can then build (deploy) an instance from that pattern and create a link that associates this instance with the pattern. Thus, the deployment engine can maintain an instance database, where one entry of an instance can be a pointer (e.g., by an identifier, or by a URL) to the pattern from which the instance had been created.

Figure 2:
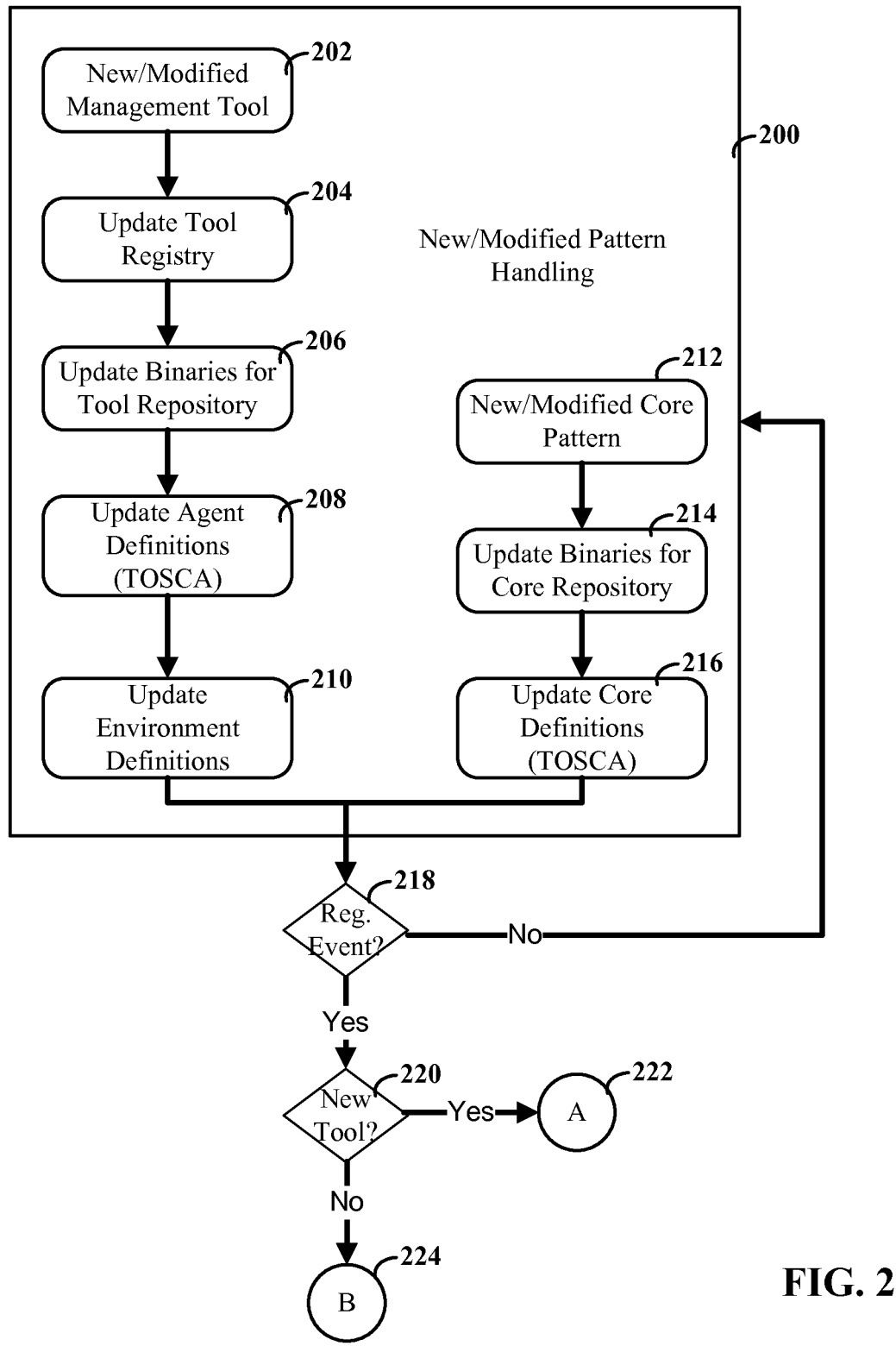
FIG. 2 depicts a flow diagram for handling core and extension patterns, consistent with embodiments of the present disclosure.

FIG. 2 depicts a flow diagram for handling core and extension patterns, consistent with embodiments of the present disclosure. Aspects of the present disclosure are directed toward management or handling of new and modified core deployment patterns, extension deployment patterns or both. Section 200 depicts an example of process flows or algorithms relative to extension patterns or core patterns. In particular, blocks 202-210 depict aspects relative to new or modified extension patterns, and blocks 212-216 depict aspects relative to new or modified core patterns.

A new management tool (or a modification to an existing management tool) can be identified by a system administrator for handling by the deployment system, as shown by block 202. For instance, a system administrator may desire to add management and reporting functions to various types of components from core patterns (whether the core patterns have already been deployed, are slated for future deployment, or both). In some embodiments, the management tool can explicitly identify tools/agents for deployment onto instances of core deployment patterns that contain specific types of components. The management tool can also include components that are external to the deployed instances of core patterns. For instance, the management tool can include one or more monitoring servers that collect information from deployed instances. When a system administrator selects, configures and/or creates a management tool, the corresponding API can be configured to identify the types of components it can manage (e.g., monitor) and whether agents are to be deployed on the managed systems.

As shown in block 204, the new management tool (or monitoring agent) can be registered in a tool registry, such as tool registry 138. The registry entry can include information such as an endpoint address of the API, type of components to be managed, agent definitions and pointer(s) to agent installable files in a management tool (software) repository (e.g., extension pattern storage server 112). As shown by block 206, the management tool repository (e.g., extension pattern storage server 112) can be updated with the agent installable files (e.g., binaries). As shown in block 208, the agent definitions can also be updated to define how a deployment engine should install, configure, and start the agent. These definitions can be formatted according to a variety of different proprietary or standardized protocols, such as a TOSCA NodeType.

In some embodiments, an entry can also be added to an environment management settings registry (e.g., environment definitions server 120) as shown by block 210. This entry can include information about how the tool is used (or not used) and configured for different environments (e.g., development environments, test environments, production environments and combinations thereof).

Consistent with embodiments, a new core pattern or a modification to an existing core pattern can be identified by a system administrator for handling by the deployment system, as shown in block 212. As shown by block 214, a core pattern repository (e.g., core pattern storage server 106) can be updated with the installable files (e.g., binaries) of the new core pattern. As shown by block 216, the component definitions can also be updated to define how a deployment engine should install, configure, and start the various components. These definitions can be formatted according to a variety of different proprietary or standardized protocols, such as a TOSCA NodeType, and may use the same format as the component definitions for the extension patterns.

Various embodiments relate to a management tool handler that is configured to detect a registration event that relates to the deployment (or modification) of core instances or to the registration (or modification) of extension patterns, as shown by block 218. For instance, the registration event can include the deployment of a new instance of a core pattern. In other instances, the registration event can include the registration and activation of a new tool. If no registration event is detected, the process does not advance to decision block 220. If a registration event is detected, then the management tool handler can determine whether the registration event relates to a new (or modified) management tool and extension pattern or to the deployment of a core pattern, as shown by block 220. If the registration event relates to a new tool, then the flow can proceed to branch point A (222). Otherwise, the flow can proceed to branch point B (224).

Figure 3:
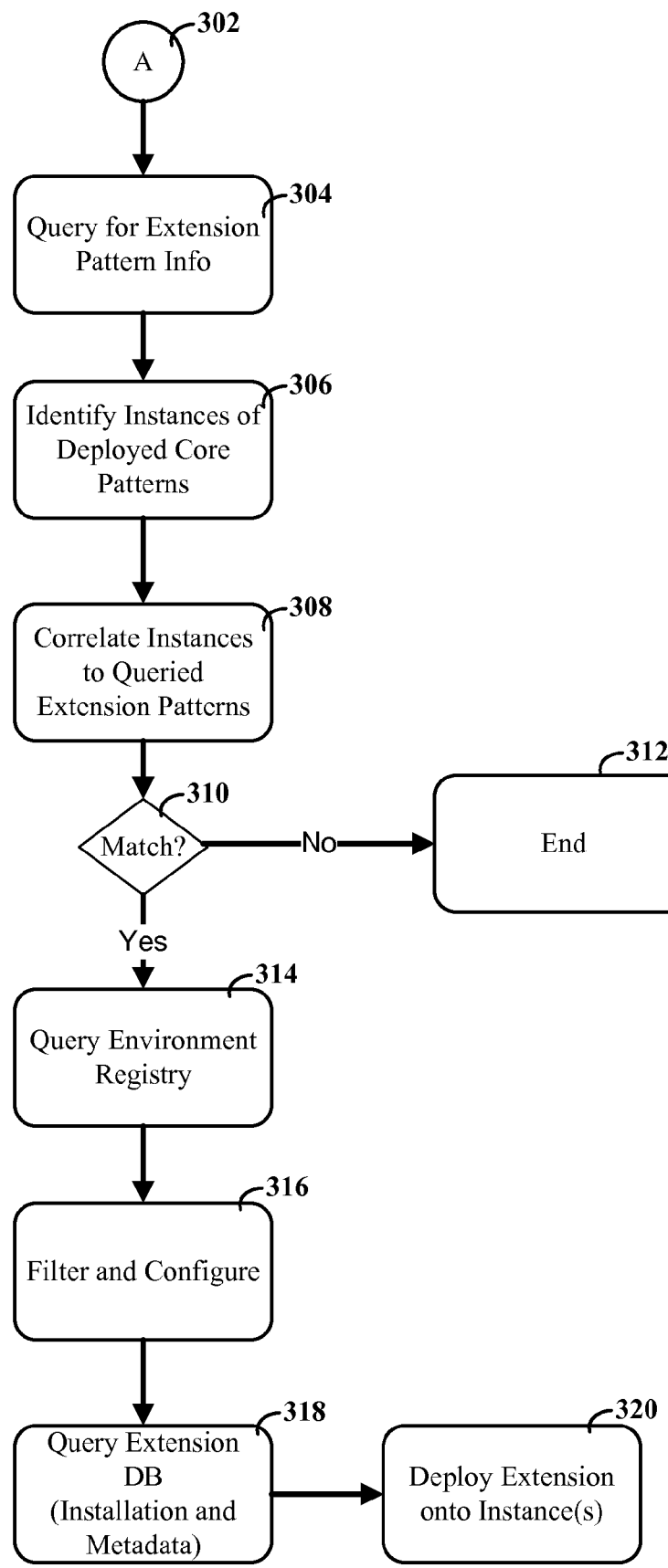
FIG. 3 depicts a flow diagram for handling a new (or modified) management tool, consistent with embodiments of the present disclosure.

FIG. 3 depicts a flow diagram for handling a new (or modified) management tool, consistent with embodiments of the present disclosure. The flow begins with branch point A (302), which corresponds to the branch point A from FIG. 2. Consistent with embodiments, the branch point may correspond to the pattern engine management tool handler detecting a new (or modified) entry in the management tool registry database. The management tool handler can then query the management tool registry server/database for extension pattern info, as shown by block 304. This query can return information from the API of the management tool. The information can specify endpoint address of the API, type of monitored components, agent definition, and a pointer to agent installable files, among other things. In certain embodiments, the registry stores a pointer to an extension pattern EP. That pattern then in turn contains pointers to installable files, configuration scripts and additional metadata.

The management tool handler can then use the information from the query to identify and correlate the new management tool with instances of deployed core patterns, per block 308. For instance, the correlation can include matching the API tool metadata with individual components from stored core deployment patterns. Links from the core pattern to one or more deployed instances can also be used to identify candidate instances for extension pattern deployment.

The management tool handler can then determine whether or not any instances have components that were identified as matching the queried data for the new management tool entry. If no match is found then the process can end, as shown by block 312. If a match is found, then the management tool can query the environment registry for the matching instances, as shown by block 314. As discussed herein, the environment registry data can include information such as whether the instance is deployed in a test environment, a development environment, a production environment or other environment.

The management tool handler can then filter matching components and instances based upon the queried environment data, as shown in block 316. For instance, metadata for the new management tool could specify that the tool should not be deployed in test environments. The management tool handler could then filter out all instances that reside in test environments.

The management tool handler can then query the extension database for installation files and related metadata, as shown by block 318. This information can be used to deploy the extension onto the corresponding instances, as shown by block 320.

Figure 4:
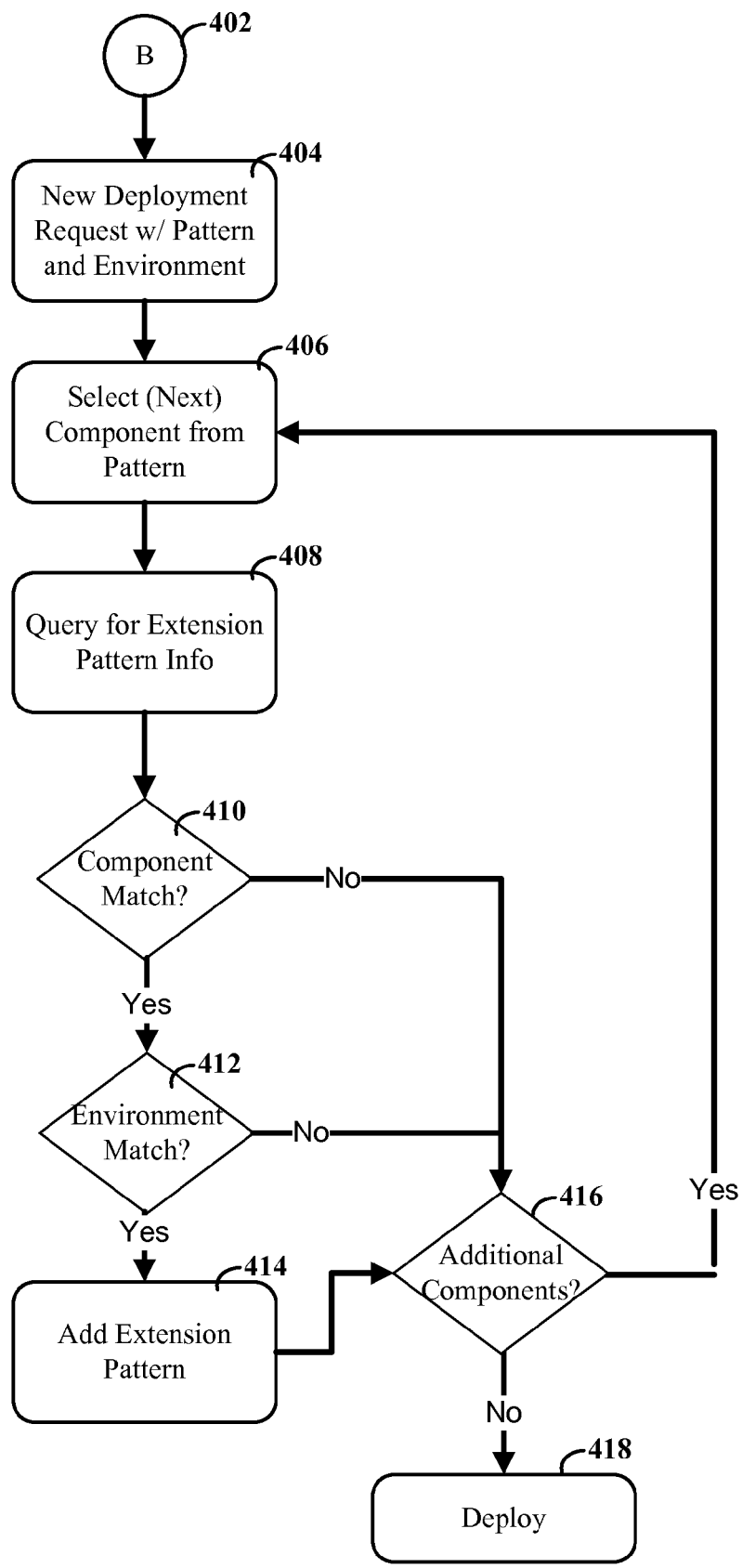
FIG. 4 depicts a flow diagram for handling a new (or modified) deployment of an instance of a core pattern, consistent with embodiments of the present disclosure.

FIG. 4 depicts a flow diagram for handling a new (or modified) deployment of a core pattern instance, consistent with embodiments of the present disclosure. The flow begins with branch point B (402), which corresponds to the branch point B from FIG. 2. Consistent with embodiments, the branch point may correspond to the pattern engine management tool handler detecting a request for deployment of a new (or modified) instance of a core deployment pattern. The request may identify, for example, the deployment pattern and desired environment(s), as shown by block 404.

The management tool handler can select a component from the core deployment pattern, as shown by block 406. The management tool handler can then query the management tool registry to retrieve extension pattern metadata/information that corresponds to the selected component, per block 408. The management tool handler can use the results of the query to determine if any component matches, per block 410.

If components are found to match in the query, per block 410, then the management tool handler can also determine whether or not the desired environment(s) for the instance match the extension pattern metadata. If not, the process can proceed to decision block 416. If a match is found, however, the management tool handler can add the extension pattern component(s) (or agent(s)) to the core deployment pattern. For instance, the management tool handler can direct the deployment engine to add an agent node to specific instance(s) of the core deployment pattern, while leaving other instances and the core deployment pattern within the core pattern storage server unaffected by the extension deployment.

The management tool handler can determine whether or not any additional components exist in the core deployment pattern, per block 416. If additional components do exist, then the management tool handler can select the next component per block 406 and the process can repeat. If no component matches, then the pattern can be deployed with added extensions (if any), per block 418.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
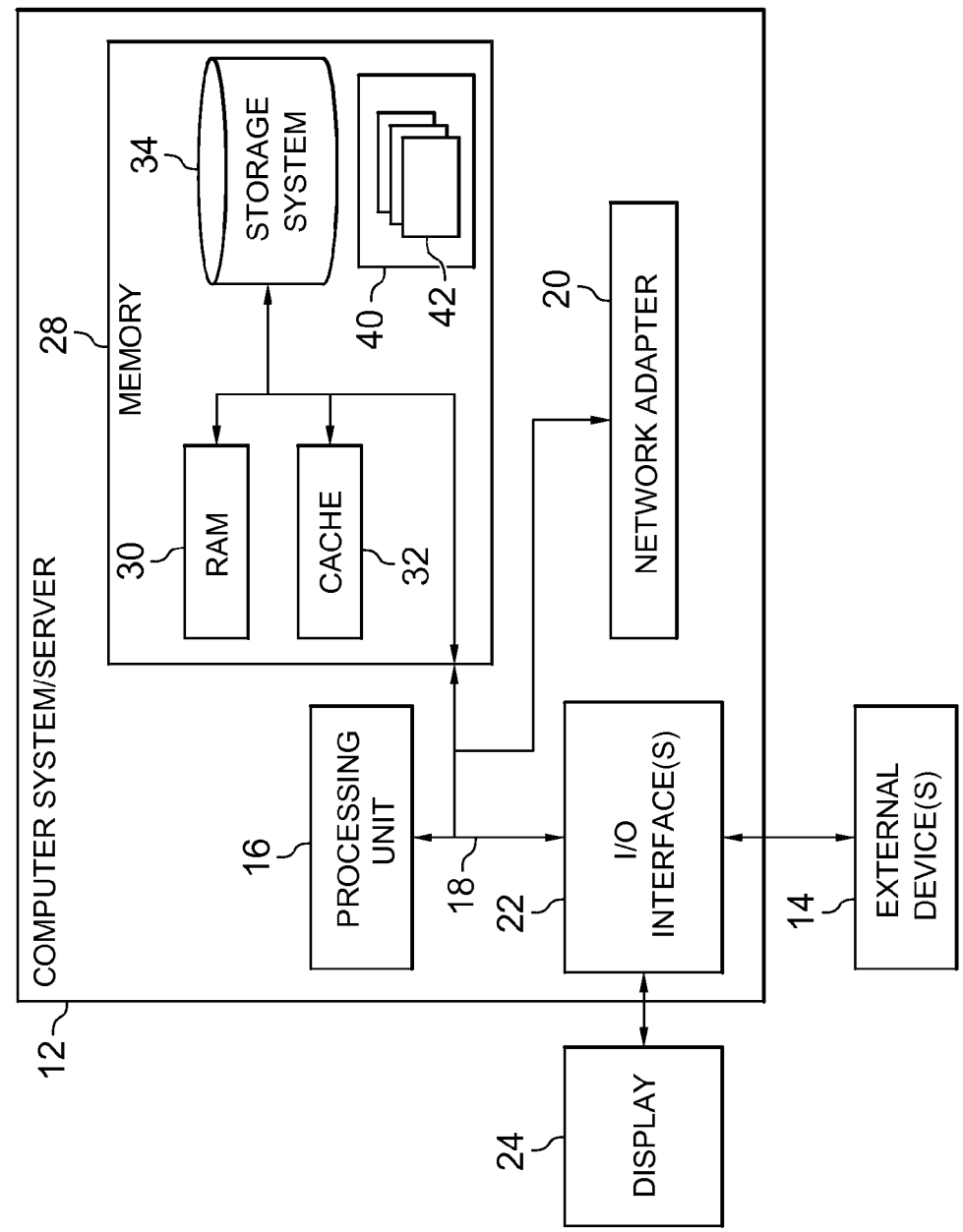
FIG. 5 depicts a cloud computing node, according to an embodiments of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
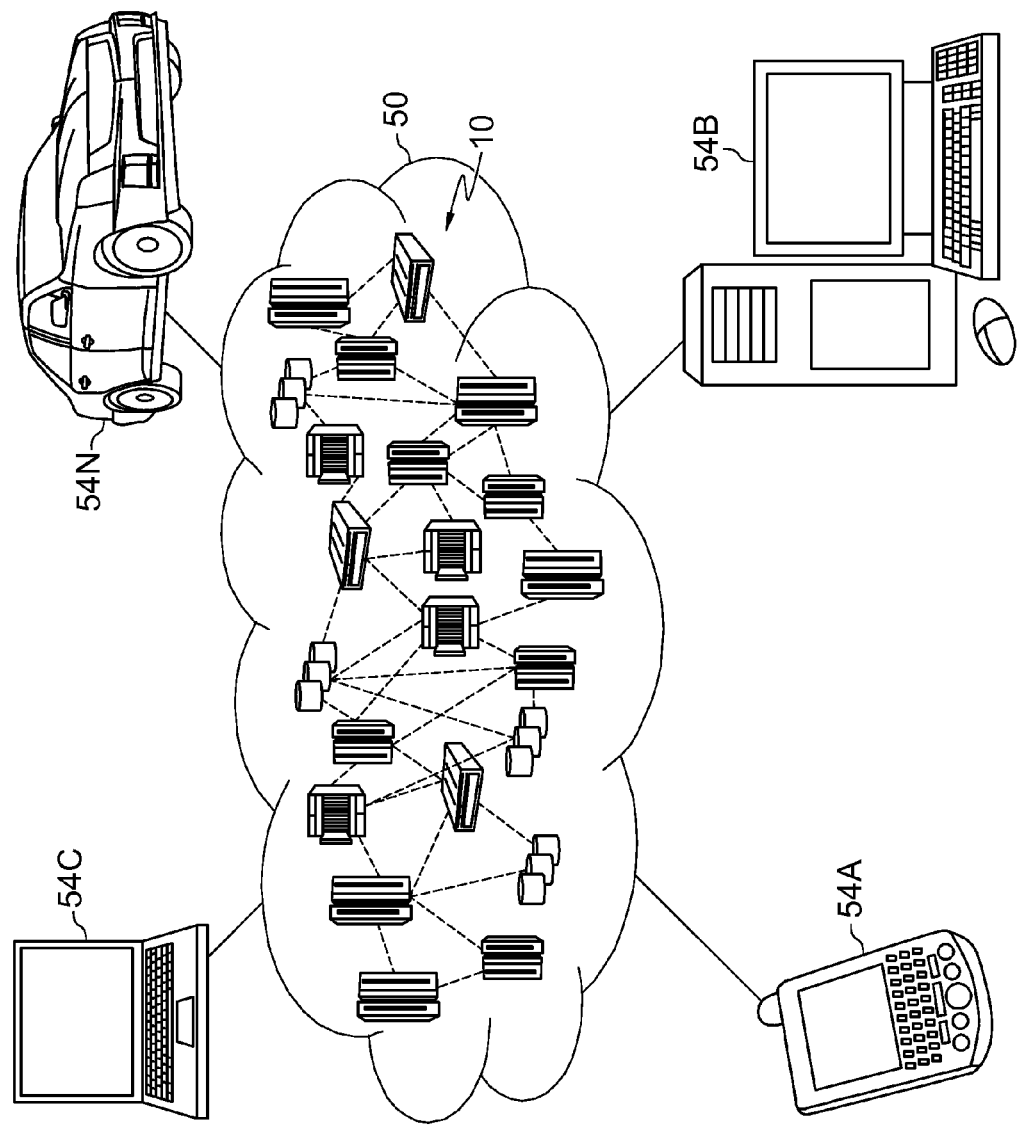
FIG. 6 depicts a cloud computing environment, according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
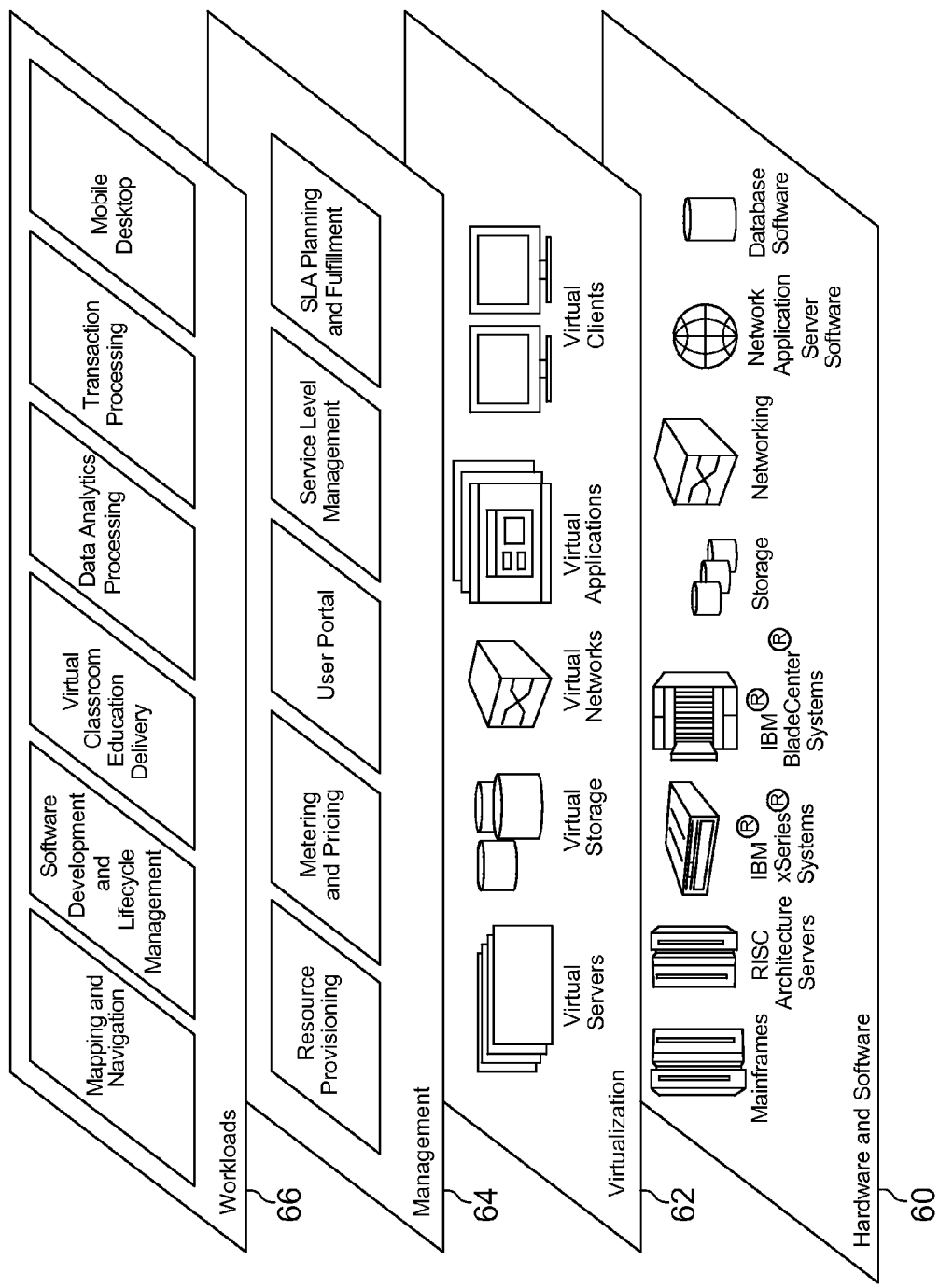
FIG. 7 depicts abstraction model layers, according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Various aspects of the present disclosure are directed toward deployment of components within the virtualization layer 62 using patterns that may include extensions, as discussed in more detail herein.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing; and mobile desktop.

Figure 8:
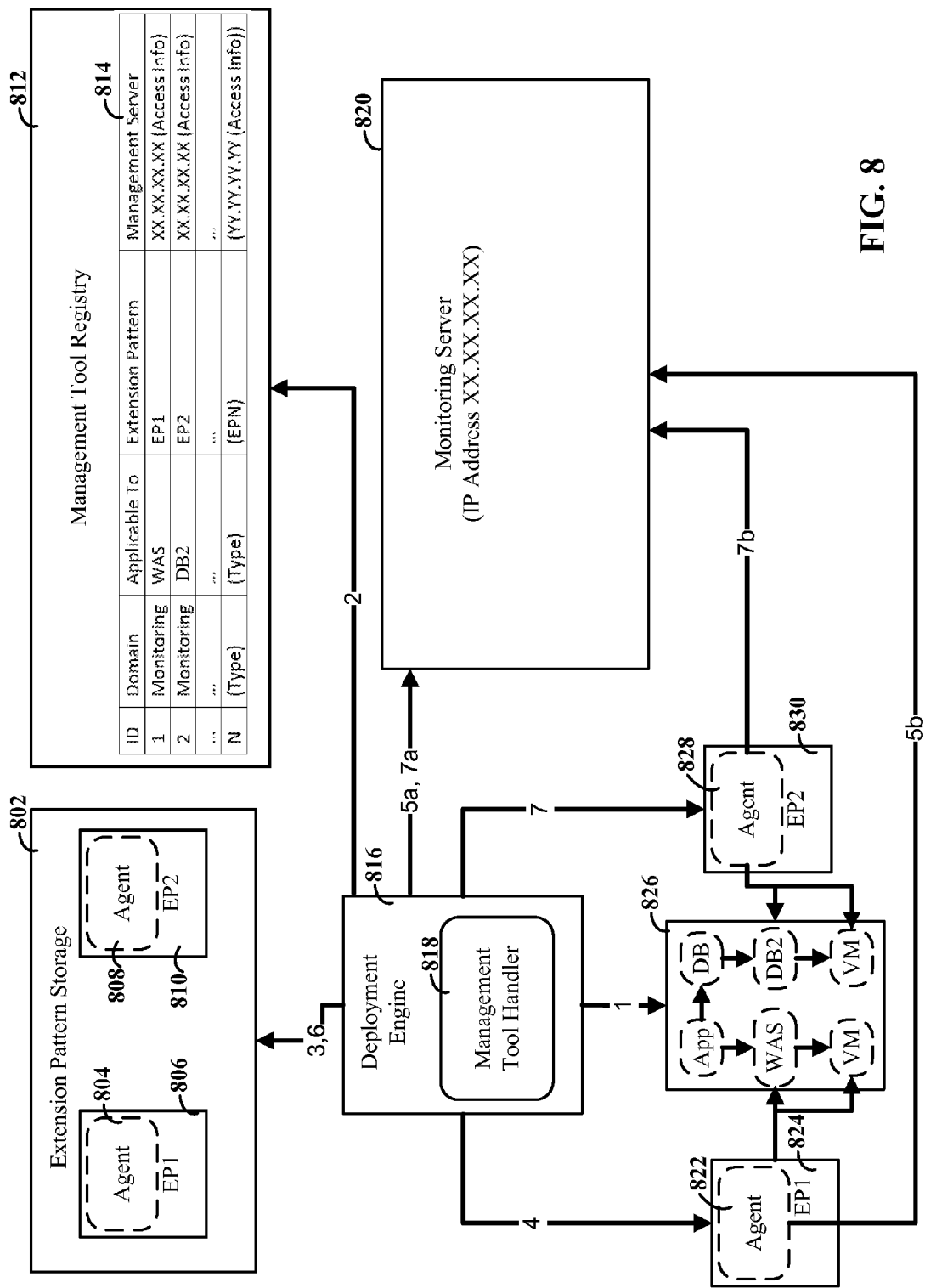
FIG. 8 depicts a block diagram of a system that also shows sequencings of the deployment of extension patterns on top of an instance of a deployed core pattern, consistent with embodiments of the present disclosure.

FIG. 8 depicts a block diagram of a system that also shows sequencings of the deployment of extension patterns on top of an instance of a deployed core pattern, consistent with embodiments of the present disclosure. As described herein, the system can include a deployment engine 816 that includes a deployment management tool handler 818. Extension pattern storage 802 can be configured to store multiple extension patterns as shown by EP1 and EP2, 806 and 810 respectively. The extension patterns can each define one or more agents 804, 808.

Management tool registry 812 can store information about the extensions patterns in a database. As an example, table 814 stores information about an extension pattern identifier (ID), the environment or domain for deployment, name of the extension pattern, and information about a management server for the agent (e.g., IP address and security/login information). Other configurations and types of information can also be stored in the database or table.

Instance 826 represents a particular example of a deployed core pattern, the components of which are discussed in more detail herein. Instances 824 and 830 represent two deployed extension patterns, each with a corresponding monitoring agent 822, 828, respectively. Monitoring server 820 can be configured to communicate with one or more deployed extension patterns (e.g., to obtain and analyze monitoring data for instances of deployed core patterns).

For ease of discussion, definition files are discussed here with regards to certain portions of such files. It is understood, however, that definitions files can contain additional metadata (e.g., aligned with the TOSCA standard). In particular, the following descriptions of files is not meant to be limiting.

A first file can contain node type definitions for the sample application, i.e., definitions of components from which the template for the sample application can be constructed. Those definitions might be stored together with the application pattern, or separately to be re-usable by other patterns.

A second file can contain the definition of a sample two-tier application pattern. This pattern could be stored in the core pattern storage.

A third file can contain node type definitions for extension patterns, such as monitoring agent type definitions from which extension patterns can be constructed. Those definitions might be stored together with the extension pattern, or separately to be re-usable by other patterns.

A fourth file can contain the definition of the extension pattern "EP1" for deployment of a WebSphere Application Server (WAS) monitoring agent. This pattern could be stored in the extension pattern storage.

A fifth file can contain the definition of the extension pattern "EP2" for deployment of a DB2 monitoring agent. This pattern could be stored in the extension pattern storage.

The example core pattern defines a two-tier application running on two servers "webtier_server" and "db_tier_server". On the first server, a WebSphere Application Server instance "app_server" gets deployed, and on the second server, a DB2 instance "dbms" gets deployed. The WAS instance in turn is hosting an application "app", and the DB2 instance is hosting a database "db2".

Relationships between nodes are defined in the "requirements" section of node templates. For example, the "app_server" node has a relation to the server on which it is installed via the "host" requirement:

```
app_server:
    type: WAS
    properties:
        install_path: /{pathname}
        admin_port: {port #}
    requirements:
        host: webtier_server
```

The "host" entry in the requirements section points by name to the node template representing the server on which the WAS instance is running.

The "type" attribute of each node template denotes the type of modeled component. Details of those types can be defined as node types in a separate file. Those type definitions define, for example, the properties of the component, requirements against other components, artifact that are need for instantiating a component, as well as scripts for installing and configuring the component. For the WAS node type the definition can looks as follows:

```
WAS:
    description: WebSphere Application Server instance
    derived_from: Application Server
    properties:
        install_path:
            type: string
            description: Path where binaries are installed
        admin_port:
            type: integer
            description: TCP port for admin connections
    requirements:
        host: Server
    artifacts:
        was_installable:
            type: tar.gz
            location: ftp://my.server/was_installables/WAS.tar.gz
    interfaces:
        lifecycle:
            install: scripts/install_was.sh
            configure: scripts/configure_was.sh
```

A node type can be derived from another node type, e.g. from a generic application server node type. In the requirements section of the node type definition, named requirements are defined along with the type of required node. In the example above, it is defined that a "host" of type "Server" is required, i.e. the WAS instance must be installed on a server. In the "artifacts" section, a pointer to the installable for WAS is given, which can serve as a type of uniform resource identifier (URI) that points to the concrete location where the installable can be found. In the "interfaces" section, lifecycle operation for installing, configuring, etc. the component are defined, along with pointers to scripts or other automation assets that can be executed by a deployment engine to install and configure the component. A deployment engine can look for those operations to determine how to carry out deployments.

Upon deployment of an instance (per action/line #1 in FIG. 8), the deployment engine can read the core pattern and start processing its nodes, starting with those that do not have any requirement. For instance, the deployment engine can start deploying the two server nodes by creating two virtual machines (VMs). Once the VMs have been created, the deployment engine can deploy the "app_server" and "dbms" nodes.

For each node of the pattern that is processed, the deployment engine's management tool handler can check whether management tools shall be applied. The following text focuses on that aspect with reference to the "app_server" node of type "WAS."

As shown by line #2, the management tool handler of the deployment engine can check the management tool registry for the presence of extensions for a WAS component type. As shown in table 814, the registry can provide a pointer to a corresponding extension pattern (EP1). Other information can also be provided, such as address information and further metadata for a monitoring server. The management tool handler can perform a similar check for other components.

The management tool handler can then use the pointer to retrieve the extension pattern EP1, as shown by line #3. This retrieval process can also be undertaken for other extension patterns, as shown by line #6. An example of portions of an extension pattern for EP1 is provided as follows:

```
tosca_definitions_version: tosca_definitions_simple_1.0
id: EP1
input:
    was_instance:
        type: node_reference
        description: Reference to the WAS instance to be monitored
    target_server:
        type: node_reference
        description: Server on which to install the agent
    monitoring_server_ip:
        type: string
        description: >
            IP address of the monitoring server with which to register
        the agent monitoring_level:
            type: string
            description: Level of monitoring to configure
node_templates:
    agent:
        type: WAS_agent
        properties:
            was_install_dir: { get_ref_property: [ was_instance,
              install_path ] }
            was_admin_port: { get_ref_property: [ was_instance,
              admin_port ] }
            monitoring_level: { get_input: monitoring_level }
            monitoring_server_ip: { get_input:
              monitoring_server_ip }
        requirements:
            host: { get_input: target_server }
            was_instance: { get_input: was_instance }
```

The extension pattern contains the definition of an "agent" of type "WAS_Agent" that should be deployed during the action shown by line #7. Consistent with certain embodiments, the definition of the "WAS_Agent" type can be given in a separate file. The pattern can receive as input upon deployment: the WAS instance to be monitored, information about the monitoring server, and the monitoring level to configure. Within the definition of the "agent" node template, those input parameters are assigned to properties of the agent. Configuration scripts can then access those provided properties at deployment time to properly configure the agent.

One of the parameters of the agent is for a "was_instance", which is the particular WAS instance to be monitored. This reference is initialized to the reference to a WAS instance node template that is passed upon deployment. By means of the "get_ref_property" function, properties of that WAS instance node can be assigned to properties of the agent so it can be properly configured at deployment time.

The deployment engine, or the management tool handler, respectively, holds a reference to the "app_server" node (the WAS instance node) when deploying the core pattern at the time all the extension pattern metadata is processed. This reference can be passed into the extension pattern being instantiated as an input parameter to establish the link between the core and the extension pattern.

The deployment engine can also have access to information about the monitoring server, which can be obtained from the management tool registry. This information can also be passed as input and can be used for agent configuration. For instance, the monitor server can be provided information about the deployed agent (as shown by line #5a), and the agent can be directed to provide monitor data to the proper monitor server (as shown by line #5b).

A sample definition of the "WAS_Agent" node type is shown below:

```
WAS_Agent:
    description: Monitoring agent for WAS
    derived_from: Agent
    properties:
        was_install_dir:
            type: string
            description: Directory where WAS is installed
        was_admin_port:
            type: integer
            description: Admin port of the monitored WAS
        monitoring_level:
            type: string
            description: Level of monitoring to configure (e.g. low,
                medium, high)
        monitoring_server_ip:
            type: string
            description: IP address of the monitoring server
    requirements:
        host: Server
        was_instance: WAS
    artifacts:
        agent_installable:
            type: zip
            location: ftp://some.server/was_agent/was_agent.zip
    interfaces:
        lifecycle:
            install: scripts/install_was_agent.sh
            configure: scripts/configure_was_agent.sh
```

This type definition can define the properties that can to be configured on the agent, such as the settings of the monitored WAS instance, or monitoring levels. It can also define requirements, such as the agent has a requirement against a node of type "WAS." This can mean, for example, that the agent depends on the WAS instance that shall be monitored by the agent. This requirement can be fulfilled by the respective entry in the requirements section of the "agent" node template shown earlier. The agent type definition can also contain references to agent installables as well as install and configuration scripts.

As far as the processing flow for extension pattern deployment (or the deployment of the "agent" node template in the concrete example) is concerned, the WAS instance node is shown as being configured first. This can be particularly relevant when the agent has a dependency on the node because the deployment engine can ensure this dependency is met by first configuring the WAS instance.

After the agent has been deployed, the deployment engine continues processing the core pattern. For the DB2 node, the same flow as outlined for the WAS instance can be followed (e.g., as relevant to line #s 6, 7, 7a and 7b).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for deploying extension patterns to core deployment patterns stored in a first software repository, the method comprising:
    identifying one or more deployed instances of one or more core deployment patterns;
    detecting an event relating to a registration of a component;
    querying, in response to detecting the event, a tool registry to identify one or more extension deployment patterns for use with the one or more core deployment patterns;
    retrieving, based upon the query, one or more extension deployment components from a second software repository, wherein the extension deployment components are nodes;
    accessing, for each instance of the one or more core deployment patterns, environmental information, the environmental information indicating an environment in which each instance of the one or more core deployment patterns is deployed;
    filtering the one or more extension deployment components based upon the environmental information and metadata of the one or more extension deployment components, wherein the metadata of the one or more extension deployment components indicates one or more environments in which the one or more extension deployment components are configured to be deployed; and
    deploying, in response to the filtering of the extension deployment components, the one or more extension deployment components on top of one or more instances of the one or more core deployment patterns, causing management agents to be installed on the respective instances.

2. The method of claim 1, wherein the event is the deployment of a core deployment pattern.

3. The method of claim 1, wherein the event is the registration of a new extension deployment pattern.

4. The method of claim 1, wherein the event is the registration of a new management tool corresponding to an extension deployment pattern.

5. The method of claim 1, further comprising accessing a core deployment pattern from the first software repository using a first interface and accessing an extension deployment pattern from the second software repository using the first interface.

6. The method of claim 1, further comprising retrieving, for components of each of the one or more instances of the one or more core deployment patterns, an Internet Protocol (IP) address and configuration information for ports associated with the IP address.

7. The method of claim 1, wherein deploying the one or more extension deployment components on top of one or more instances of the one or more core deployment patterns does not modify the original core deployment pattern(s).

8. The method of claim 1, wherein the extension deployment components include one or more selected from the group consisting of: a virtual machine, a web server, a software application, a software service, a database, and a database management system.

9. The method of claim 1, wherein the environment in which each instance of the one or more core deployment patterns is deployed is selected from the group consisting of a test environment, a development environment, and a production environment.

10. The method of claim 1, wherein the one or more deployed instances of one or more core deployment patterns includes a first instance, the first instance being deployed in a test environment, and wherein the filtering the one or more extension deployment components based upon the environmental information and metadata of the one or more extension deployment components includes:
    identifying a first extension deployment component;
    determining, based on metadata for the first extension deployment component, that the first extension deployment component should not be deployed in test environments; and removing the first extension deployment component from the one or more extension deployment components to be deployed on top of the first instance.

\* \* \* \* \*